(12) United States Patent
Saito

(10) Patent No.: US 12,481,477 B2
(45) Date of Patent: Nov. 25, 2025

(54) SIGNAL PROCESSING METHOD AND SIGNAL PROCESSING DEVICE

(71) Applicant: Yamaha Corporation, Shizuoka (JP)

(72) Inventor: Kosuke Saito, Milton Keynes (GB)

(73) Assignee: Yamaha Corporation, Shizuoka (JP)

( * ) Notice: Subject to any disclaimer, the term of this patent is extended or adjusted under 35 U.S.C. 154(b) by 643 days.

(21) Appl. No.: 17/864,229

(22) Filed: Jul. 13, 2022

(65) Prior Publication Data

US 2023/0017387 A1 Jan. 19, 2023

(30) Foreign Application Priority Data

Jul. 14, 2021 (JP) .................................. 2021-116131

(51) Int. Cl.
G06F 3/00 (2006.01)
G06F 3/16 (2006.01)
H04N 21/233 (2011.01)

(52) U.S. Cl.
CPC ........... *G06F 3/165* (2013.01); *H04N 21/233* (2013.01)

(58) Field of Classification Search
CPC .............................. G06F 3/165; H04N 21/233
See application file for complete search history.

(56) References Cited

U.S. PATENT DOCUMENTS

2005/0192688 A1* 9/2005 Takemura .............. H04H 60/04
381/119

FOREIGN PATENT DOCUMENTS

JP 4023328 B2 12/2007

* cited by examiner

*Primary Examiner* — Rasha S Al Aubaidi
(74) *Attorney, Agent, or Firm* — Global IP Counselors LLP; David Tarnoff

(57) ABSTRACT

A signal processing method includes inputting a sound signal to each of a plurality of signal processing blocks of different types, signal-processing the sound signal input to each of the plurality of signal processing blocks based on setting data that indicate one or a plurality of parameters, selecting an operated parameter operated by a parameter operation in response to receiving the parameter operation for the one or the plurality of parameters, storing the setting data that indicate the one or the plurality of parameters that include the operated parameter, and reading out, from among the stored setting data, only the operated parameter that is selected, and deploying the operated parameter that is read out to at least one of the plurality of signal processing blocks, in response to receiving a recall operation for reading out the stored setting data.

17 Claims, 14 Drawing Sheets

| TYPE OF SIGNAL PROCESSING | RANGE DATA |
|---|---|
| ATT | D1 |
| EQ | D0 |
| GATE | D0 |
| COMP | D1 |
| FADER | D0 |
| SEL | D1 |
| PAN | D0 |
| SEND | D1 |

| No. | TITLE | COMMENTS | STATUS | TIME STAMP |
|---|---|---|---|---|
| 2.00 | SCENE 2 | | | 1/30/2021 15:32:33 |
| 3.00 | SCENE 3 | | | 2/4/2021 9:11:37 |
| 4.00 | SCENE 4 | | | 1/29/2021 16:54:21 |
| 5.00 | SCENE5 | | | 2/1/2021 14:3:54 |

RECALL

FIG. 2

| No. | TITLE | COMMENTS | STATUS | TIME STAMP | |
|---|---|---|---|---|---|
| 2.00 | SCENE 2 | | | 1/30/2021 15:32:33 | CLEAR |
| 3.00 | SCENE 3 | | | 2/4/2021 9:11:37 | CLEAR |
| 4.00 | SCENE 4 | | | 1/29/2021 16:54:21 | CLEAR |
| 5.00 | SCENE5 | | | 2/1/2021 14:3:54 | CLEAR |
| | | | | | |

RECALL

FIG. 14

SIGNAL PROCESSING METHOD AND SIGNAL PROCESSING DEVICE

CROSS-REFERENCE TO RELATED APPLICATIONS

This application claims priority to Japanese Patent Application No. 2021-116131, filed on Jul. 14, 2021. The entire disclosure of Japanese Patent Application No. 2021-116131 is hereby incorporated herein by reference.

BACKGROUND

Technical Field

One embodiment of the present invention relates to audio signal processing.

Background Information

Conventionally, in the field of audio, a so-called focus recall function is used, in which signal processing parameters are stored as scene data and only some of the parameters of the scene data are read out (recalled) (see, for example, the mixing system control method of Japanese Patent No. 4023328).

SUMMARY

However, in the mixing system control method of Japanese Patent No. 4023328, operations to change parameters of an equalizer, a compressor, and the like, and operations to select parameters to be recalled are received separately.

Therefore, an object of one embodiment of this disclosure is to provide a signal processing method for receiving changes of parameters and selection of parameters to be recalled with a simple operation.

A signal processing method according to one aspect of this disclosure comprises inputting a sound signal to each of a plurality of signal processing blocks of different types, signal-processing the sound signal input to each of the plurality of signal processing blocks based on setting data indicating one or a plurality of parameters, selecting an operated parameter operated by a parameter operation in response to receiving the parameter operation for the one or the plurality of parameters, storing the setting data that indicate the one or the plurality of parameters that include the operated parameter, and reading out, from among the setting data that are stored, only the operated parameter that is selected, and deploying the operated parameter that is read out to the plurality of signal processing blocks, in response to receiving a recall operation for reading out the setting data that are stored.

BRIEF DESCRIPTION OF THE DRAWINGS

FIG. 2 is an explanatory diagram showing one example of a scene list screen.

FIG. 14 is an explanatory diagram showing one example of a scene list screen in Modified Example 2.

DETAILED DESCRIPTION OF THE EMBODIMENTS

Selected embodiments will now be explained in detail below, with reference to the drawings as appropriate. It will be apparent to those skilled from this disclosure that the following descriptions of the embodiments are provided for illustration only and not for the purpose of limiting the invention as defined by the appended claims and their equivalents.

First Embodiment

Figure 1:
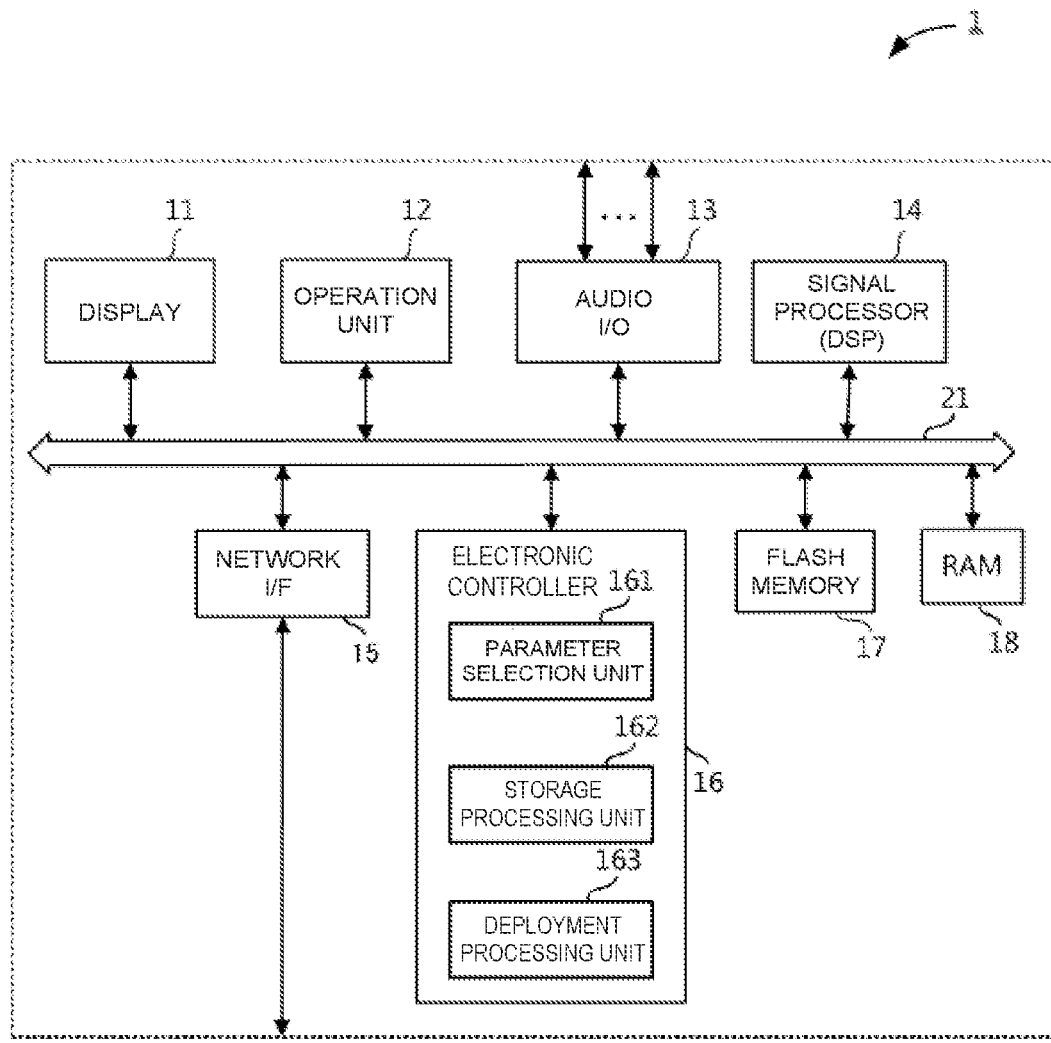
FIG. 1 is a block diagram showing one example of a configuration of an audio mixer.
Figure 3:
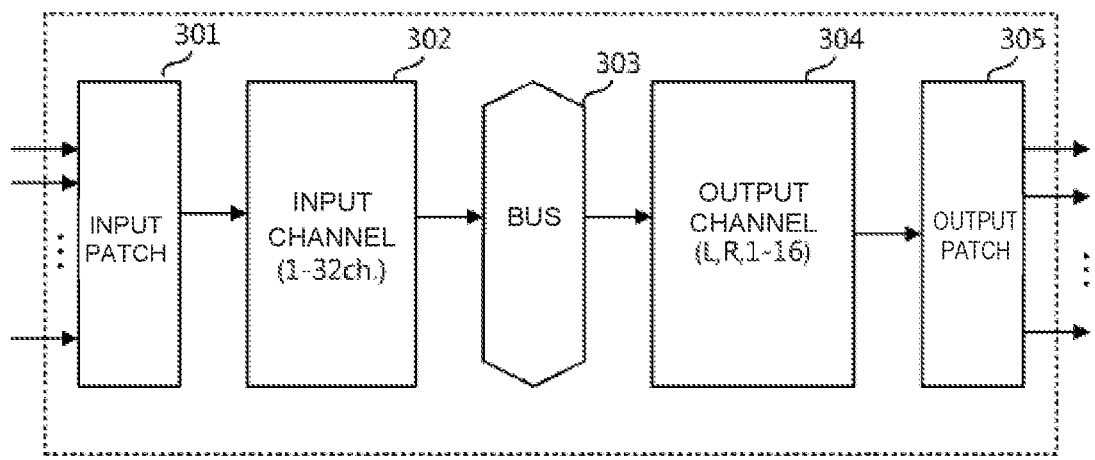
FIG. 3 is a block diagram showing one example of a signal processing function.
Figure 4:
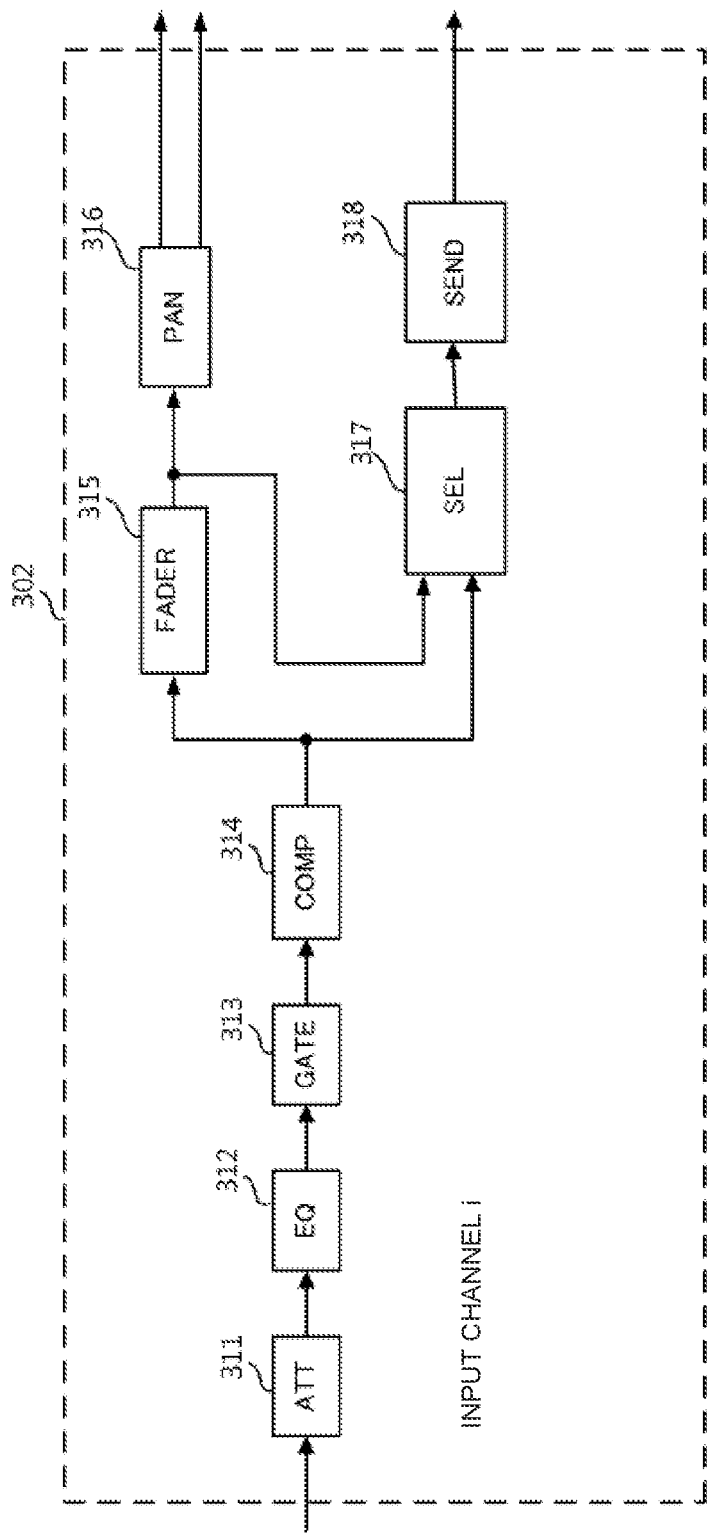
FIG. 4 is a block diagram showing one example of a configuration of an input channel i.
Figure 5:
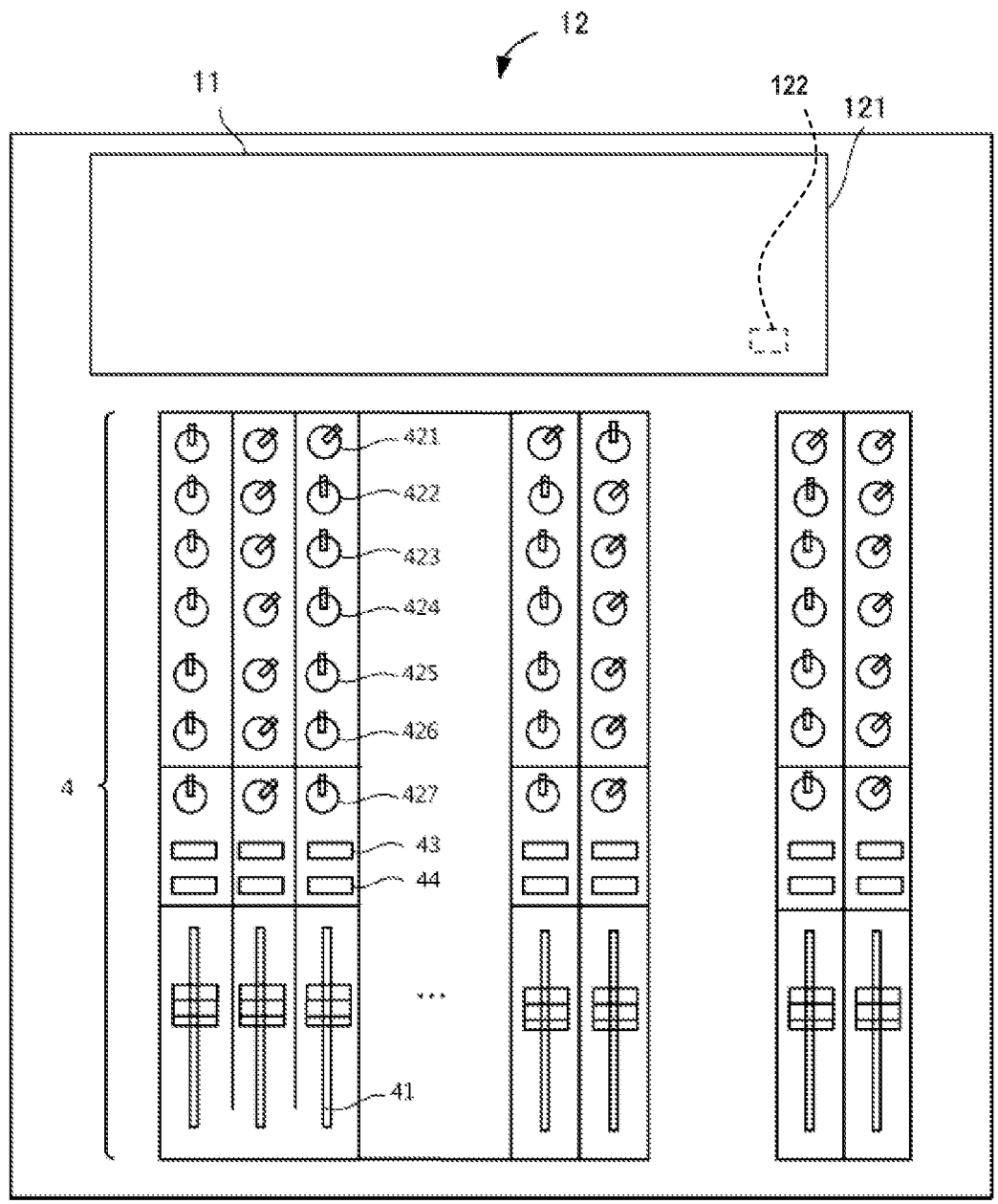
FIG. 5 is a diagram showing one example of a configuration of an operation panel of the audio mixer.

A signal processing device according to the first embodiment will be described below with reference to the drawings. FIG. 1 is a block diagram showing one example of a configuration of an audio mixer 1, FIG. 2 is an explanatory diagram showing one example of a configuration of scene data, FIG. 3 is a block diagram showing one example of a signal processing function. FIG. 4 is a block diagram showing one example of a configuration of an input channel i. FIG. 5 is a diagram showing a configuration of an operation panel of the audio mixer 1.

The signal processing device in the present embodiment is used in audio processing for concerts, theatrical performances, etc. Examples of the audio processing include adjusting the volume, mixing sound, etc. Therefore, in the present embodiment, the audio mixer 1 is one example of the signal processing device. An example of the audio mixer 1 will be described below.

As shown in FIG. 1, the audio mixer 1 comprises a display (display unit) 11, an operation unit (user operable input) 12, an audio I/O (Input/Output) 13, a signal processor (signal processing unit) 14, a network interface (I/F) 15, an electronic controller (control unit) 16, a flash memory 17, and a RAM (Random Access Memory) 18.

The display 11, the operation unit 12, the audio I/O (Input/Output) 13, the signal processor 14, the network interface (I/F) 15, the electronic controller 16, the flash memory 17, and the RAM 18 are interconnected via a bus 21.

The audio I/O 13 receives input and output of one or more sound signals. The signal processor 14 signal-processes the one or more sound signals input to the audio I/O 13. The audio I/O 13 is provided with an input port such as an analog input port or a digital input port, that receives input of the one or more sound signals. Further, the audio I/O 13 is an interface for outputting one or more sound signals that have been processed by the signal processor 14. The audio I/O 13 is provided with an output port such as an analog output port or a digital output port, that outputs one or more sound signals. The audio I/O 13 is one example of the sound signal input (sound signal input unit) of this disclosure, which inputs a sound signal.

The network I/F 15 is an interface for communicating with other devices via a network. The network I/F 15 transmits and receives one or more sound signals that conform to a standard, such as Dante (registered trademark) via a network. The network I/F 15 is another example of the sound signal input of this disclosure.

The electronic controller 16 controls the operation of the audio mixer 1. The electronic controller can include one or a plurality of processors and is configured from one or more types of processors, such as a CPU (Central Processing Unit), a GPU (Graphics Processing Unit), a DSP (Digital Signal Processor), an FPGA (Field Programmable Gate Array), an ASIC (Application Specific Integrated Circuit), and the like. Here, the term "electronic controller" as used herein refers to hardware, and does not include a human. The electronic controller 16 reads prescribed programs stored in the flash memory 17, which is a storage unit (computer memory), into the RAM 18 to perform various operations. The electronic controller 16 functionally comprises a parameter selection unit 161, a storage processing unit 162, and a deployment processing unit 163 by the programs. The electronic controller 16 reads programs relating to the parameter selection process, the storage process, and the deployment process into the RAM 18. As a result, the electronic controller 16 constitutes the parameter selection unit 161, the storage processing unit 162, and the deployment processing unit 163. The descriptions of the parameter selection unit 161, the storage processing unit 162, and the deployment processing unit 163 will be described further below.

The flash memory 17 stores scene data corresponding to each of a plurality of scenes, such as scene 1, scene 2, scene 3, and scene 4.

The display 11 displays various information in accordance with the control of the electronic controller 16. The display 11 is configured by an LCD (Liquid Crystal Display) or light-emitting diodes (LED), for example. As shown in FIG. 2, the display 11 displays a scene list screen 6, for example. The scene list screen 6 displays a number 61, a title 62, comments 63, status 64, and a time stamp 65 for each piece of scene data. The number 61 indicates the number of the scene. The title 62 indicates the name of the scene arbitrarily set by a user. The comments 63 indicate comments arbitrarily set by the user. The status 64 indicates the status of the scene. The time stamp 65 indicates the last time that the scene data were set or changed. Further, the scene list screen 6 is provided with a recall button 66.

Further, the display 11 is a display on which a touch panel 121 has been overlaid, which is one aspect of the operation unit 12, and displays a GUI (Graphical User Interface) screen for receiving user operations.

The operation unit 12 is a user operable input and receives operation of the audio mixer 1 from the user. In the present embodiment, the operation unit 12 receives a manipulation of the parameter (parameter operation) from the user. The operation unit 12 includes various operators, such as rotary encoders (knobs), buttons, sliders, and/or the like. That is, the user operates various knobs, buttons, sliders, and/or the like to change the parameter values that respectively correspond to the various knobs, buttons, sliders, and/or the like. The parameter operation includes any contact with an operator, movement of an operator, or a change of the value of an operator.

Further, the operation unit 12 includes the touch panel 121 overlaid on an LCD which is the display 11. The touch panel 121 receives a tap operation on the scene list screen 6. For example, when the user taps the scene list screen 6, the touch panel 121 selects the scene that was tapped. The operation unit 12 further includes a channel strip 4 provided on an operation panel of the audio mixer 1 as described later.

The signal processor 14 is configured by a DSP (Digital Signal Processor) for performing various signal processes, such as mixing or effects processing. The signal processor 14 inputs one or more sound signals from the audio I/O 13 or the network I/F 15 to each of a plurality of signal processing blocks of different types. The signal processor 14 signal-processes the one or more sound signals input to each of the plurality of signal processing blocks based on current data. The signal processor 14 outputs a digital sound signal that has been subjected to the signal processing via the audio I/O 13 or the network I/F 15.

As shown in FIG. 3, the signal processor 14 functionally carries out audio processing by an input patch 301, an input channel 302, a bus 303, an output channel 304, and an output patch 305. The input patch 301 inputs sound signals from a plurality of input ports (for example, analog input ports or digital input ports) of the audio I/O 13 and assigns one of the plurality of ports to at least one of a plurality of channels (for example, 32 ch).

As shown in FIG. 4, the input channel 302 carries out a plurality of types of signal processing of the sound signal(s) input from the input patch 301. The input channel 302 signal-processes the sound signal(s) input to each of a plurality of signal processing blocks based on a plurality of parameters corresponding to the signal processing blocks. In the present embodiment, the input channel 302 is configured by an attenuator (ATT) signal processing block 311, an equalizer (EQ) signal processing block 312, a gate (GATE) signal processing block 313, a compressor (COMP) signal processing block 314, a fader (FADER) signal processing block 315, a panning (PAN) signal processing block 316, a selector (SEL) signal processing block 317, and a send (SND) signal processing block 318.

The sound signals, following signal-processing by the attenuator (ATT), equalizer (EQ), gate (GATE), or compressor (COMP), are input to the fader (FADER) signal processing block 315 and to the panning (PAN) signal processing block 316. The sound signals that are input to each of the signal processing blocks 315, 316 undergo signal processing by the parameters (fader and panning) that respectively correspond to the signal processing blocks 315, 316. The fader (FADER) performs a process that adjusts the volume level of the sound signal. The sound signal whose volume level has been adjusted by the fader (FADER) is sent to the bus 303 of the subsequent stage via panning (PAN) (see FIG. 3). Panning (PAN) is a process that adjusts the balance of the sound signal. The parameters respectively used in the fader (FADER) and the panning (PAN) are determined by user parameter operations.

Further, following processing by the attenuator (ATT), equalizer (EQ), gate (GATE), or compressor (COMP), the sound signals are input to the selector (SEL) signal processing block 317 and to the send (SND) signal processing block 318 (see FIG. 4). Further, following processing by the attenuator (ATT), equalizer (EQ), gate (GATE), or compressor (COMP), the sound signals are sent to the bus 303 of the subsequent stage via the selector (SEL) (see FIG. 3). The selector (SEL) preforms the process of selecting either signals output from the compressor (COMP) or signals whose level has been adjusted by the fader (FADER) by the user selection operation. The send (SND) is a process for switching between whether or not to send the selected sound signal to each bus 303.

The sound signals that have undergone signal processing by the input channel 302 are output to the bus 303 of the subsequent stage. The sound signals output from the bus 303 are output to the output channel 304.

The output channel 304 includes 16 channels, for example. The sound signals that are input to each of the channels of the output channel 304 undergo various signal processes in the same manner as for the input channel 302. Each channel of the output channel 304 sends, to the output patch 305, the sound signals after the signal processing. The output patch 305 assigns each channel to one of a plurality of analog output ports or digital output ports. Following the signal processing, the sound signals are output to the audio I/O 13 or the network I/F 15.

As shown in FIG. 5, the touch panel 121 and the channel strip 4 are provided on the operation panel of the audio mixer 1. The touch panel 121 and the channel strip 4 correspond to the operation unit 12. In the audio mixer 1, the contents set or operated on the operation panel are sequentially reflected in the current data.

The channel strip 4 is configured by a plurality of operators that receive operations for one channel. The plurality of operators arc vertically arranged in the channel strip 4. One slider 41, a plurality (seven in FIG. 5) of knobs 421, 422, 423, 424, 425, 426, 427, and a plurality (two in FIG. 5) of buttons 43, 44 are provided per channel in the channel strip 4.

For example, the knobs 421, 422, 423 correspond to the parameter of the equalizer (EQ) (see FIG. 4) of the signal processor 14. The equalizer performs a process that amplifies or attenuates the sound signal level of a prescribed band. The knobs 421, 422, 423 are operators for changing the values of the parameter (for example, the high-frequency gain, the mid-frequency gain, and the low-frequency gain) used for the equalizer process. The parameter value used for the equalizing process is adjusted based on the operating position (degree of operation) of the knobs 421, 422, 423. The parameter value referred to here is a variable and is a value based on the operating position of the operator.

Further, the knob 424 corresponds to the parameter of the attenuator (ATT) of the signal processor 14, for example. The attenuator performs a process for attenuating the sound signal level. The knob 424 is an operator for changing the value of the parameter (for example, gain) that is used for the processing in the attenuator. The parameter value used for the processing in the attenuator is adjusted based on the operating position of the knob 424.

Further, the knob 425 corresponds to the parameter of the gate (GATE) of the signal processor 14, for example. The gate performs a process that blocks sound signals that have a lower level than a prescribed value. The knob 425 is an operator for changing the value of the parameter (for example, a threshold) that is used for gate processing. The parameter value used for gate processing is adjusted based on the operating position of the knob 425.

Further, the knob 426 corresponds to the parameter of the compressor (COMP) of the signal processor 14, for example. The compressor performs a process that compresses the volume of the sound signals. The knob 426 is an operator for changing the value of the parameter (for example, threshold) that is used for compression processing.

The parameter value used for compression processing is adjusted based on the operating position of the knob 426.

Further, the knob 427 corresponds to the parameter for the panning (PAN) of the signal processor 14, for example. That is, the knob 427 is an operator for changing the value of the parameter (for example, L/R balance) that is used for panning processing. The parameter value used for panning processing is adjusted based on the operating position of the knob 427.

Further, the slider 41 corresponds to the parameter of the fader (FADER) of the signal processor 14, for example. That is, the slider 41 is an operator for changing the value of the parameter (gain) that is used for the fader processing. The parameter value used for fader processing is adjusted based on the operating position of the slider 41.

Further, the button 43 corresponds to the parameter of the selector (SEL) of the signal processor 14, for example. That is, the button 43 is an operator for changing the value of the parameter (active/inactive) that is used for selection processing. The parameter value used for selection processing is adjusted based on the state of the button 43.

Further, the button 44 corresponds to the parameter of the send (SND) of the signal processor 14, for example. That is, the button 44 is an operator for changing the value of the parameter (send amount) that is used for send processing. The parameter value used for send processing is set based on on/off of the button 44.

Focus Recall Process

The audio mixer 1 according to the present embodiment carries out a recall process for deploying scene data to the signal processing blocks (for example, the signal processing blocks 311, 312, 313, 314, 315, 316, 317, 318). The recall process includes a focus recall process related to focus recall. Specifically, the focus recall process is for reading out only some of the parameters selected from the scene data. These parameters that are selected are subjected to the focus recall. The parameters subjected to the focus recall are set by a parameter selection process.

Figure 6:
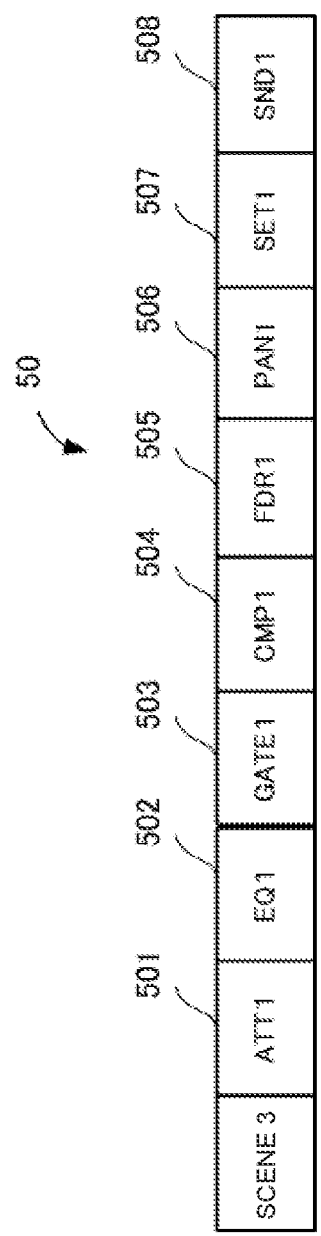
FIG. 6 is an explanatory diagram showing one example of a configuration of scene data.

Scene data 50 are stored in a storage unit, such as the flash memory 17. The scene data 50 are the current data, indicating the current parameter of each current signal processing stored in the RAM 18, that have been transferred to the flash memory 17. For example, as shown in FIG. 6, the scene data 50 are configured by an attenuator parameter 501, an equalizer parameter 502, a gate parameter 503, a compressor parameter 504, a fader parameter 505, a panning parameter 506, a selector parameter 507, and a send parameter 508. The scene data and the current data referred to in this embodiment are examples of the setting data of this disclosure, which indicate one or a plurality of parameters.

Figure 7:
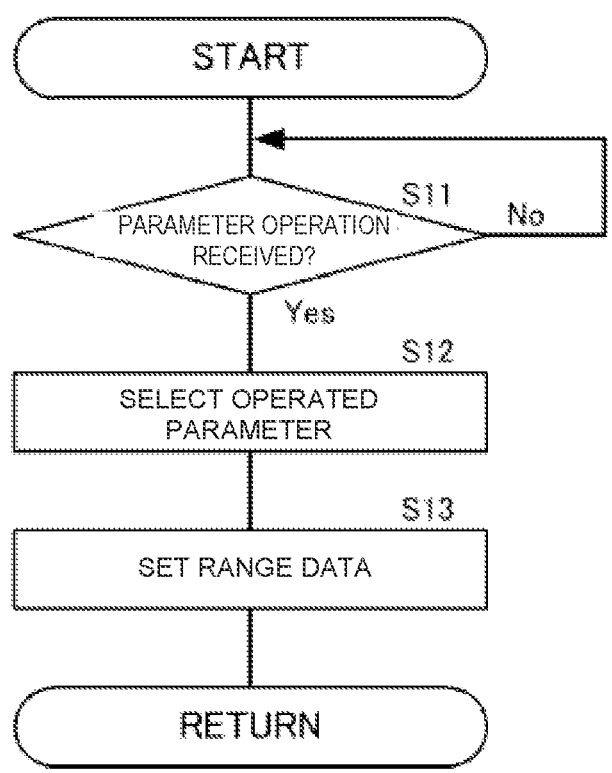
FIG. 7 is a flowchart showing one example of a parameter selection process.

The parameter selection process will be described with reference to FIG. 7. FIG. 7 is a flowchart that shows one example of the parameter selection process. Parameter selection means selection of one or more parameters that correspond to the focus recall process.

The parameter selection unit 161 selects an operated parameter that is operated by the parameter operation when the parameter operation is received. More specifically, when the operation unit 12 receives an operation with respect to the parameter (S11: Yes), the parameter selection unit 161 selects a parameter (operated parameter) corresponding to the operated operator (S12). For example, the parameter selection unit 161 determines whether an operation has been carried out based on whether an operator of the operation unit 12 has been touched by the user. Alternatively, the parameter selection unit 161 can determine that an operation has been carried out when an operator, such as a knob, has been moved.

For example, when the knob 424 corresponding to a parameter (for example, gain) of the attenuator is operated, the parameter selection unit 161 selects the parameter (gain) of the attenuator as the parameter subjected to the focus recall.

When the operating position of the knob 424 is changed, the parameter selection unit 161 changes (updates) the parameter value (gain value) of the attenuator in the current data to a value based on the operating position of the knob 424. For example, if the knob 424 is changed from Low to Middle, the parameter selection unit 161 updates the parameter value of the attenuator included in the current data from a value based on the Low position to a value based on the Middle position.

The parameter selection unit 161 sets the range data (S13). The range data indicate that the operated parameter has been selected. More specifically, the range data are data that indicate whether the parameter is to be subjected to the focus recall for each piece of the scene data.

Figure 8:
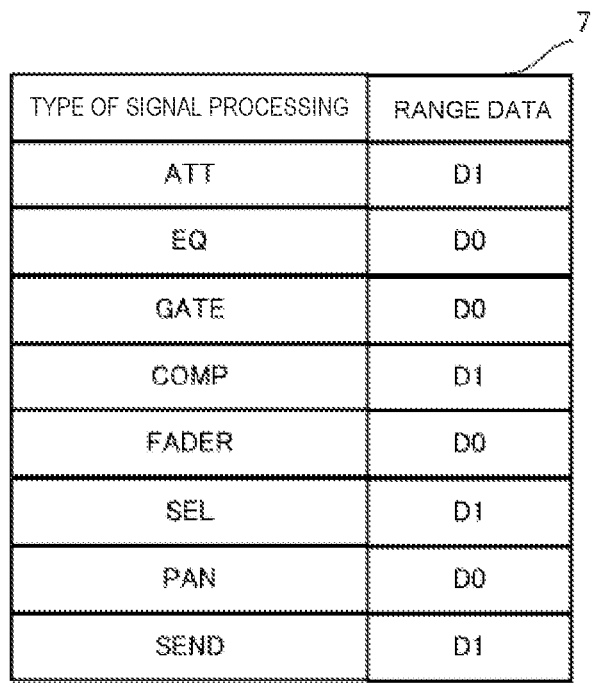
FIG. 8 is a diagram showing range data.

The range data 7 will be described with reference to FIG. 8. FIG. 8 is a diagram showing the range data 7 associated with each type of signal processing. The range data 7 are either "D1," which indicates the parameter is subjected to the focus recall, or "D0," which indicates the parameter is not subjected to the focus recall. The initial value of the range data is D0. For example, when the knob 424 is operated, the parameter selection unit 161 sets the value of the range data corresponding to the attenuator to "D1." Similarly, when operators corresponding to the compressor parameter, the selector parameter, and the send parameter are operated, the parameter selection unit 161 sets the value of the range data corresponding to the compressor, selector, and send to "D1."

Because the operators corresponding to the equalizer parameter, the gate parameter, the fader parameter, and the pan parameter have not been operated, the value of the range data corresponding to the equalizer, gate, fader, and pan is "D0."

Figure 9:
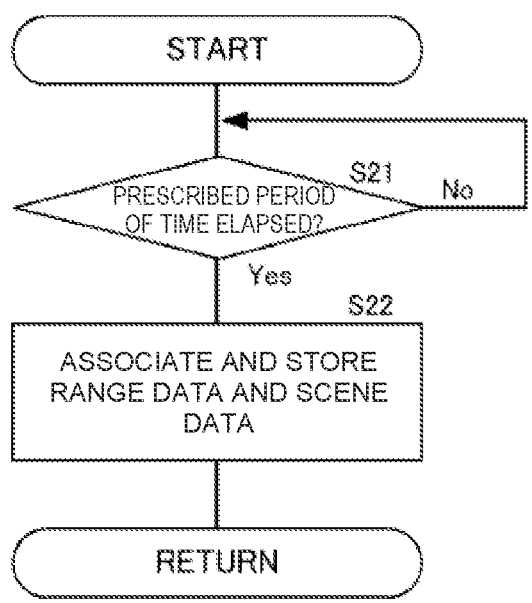
FIG. 9 is a flowchart showing one example of a storage process.

The storage process will be described with reference to FIG. 9. FIG. 9 is a flowchart showing one example of the storage process. The storage processing unit 162 stores the current data (setting data) that indicate the one or the plurality of parameters that include the operated parameter. The storage processing unit 162 stores the current data as the scene data in the flash memory 17 at a prescribed timing. More specifically, when an operation to store is received (S21: Yes), the storage processing unit 162 stores the current data as the scene data. At this time, the storage processing unit 162 associates the range data with the stored scene data and stores the range data (S22). As a result, the audio mixer 1 can determine which parameter is subjected to the focus recall for each piece of the scene data. An operation to store is a user operation and is one example of a storage operation of this disclosure. For example, when the user operates (taps) the touch panel 121 as the operation unit (user operable input) and the touch panel 121 receives the storage Operation for storing the current data, the storage processing unit 162 stores the current data as the scene data. More specifically, the user can operate (tap) a store button 122 provided on the touch panel 121 of the operation panel as shown in FIG. 5.

Figure 10:
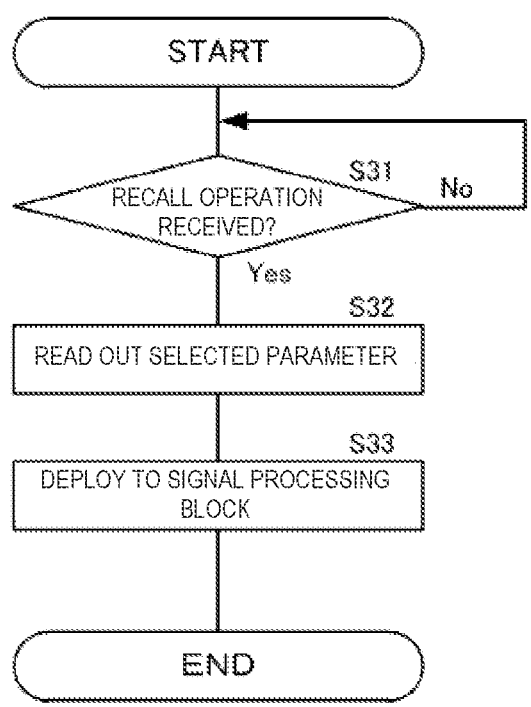
FIG. 10 is a flowchart showing one example of a focus recall process.

The focus recall process will be described with reference to FIG. 10. FIG. 10 is a flowchart showing one example of the focus recall process. The focus recall process is carried out by the deployment processing unit 163. The deployment processing unit 163 reads outs, from among the stored setting data, only the operated parameter that is selected, and deploys the operated parameter that is read out to at least one of the plurality of signal processing blocks, in response to receiving a recall operation for reading out the stored setting data. The deployment processing unit 163 deploys only the selected parameter(s) to the signal processing block(s). That is, the deployment processing unit 163 copies only the selected parameter(s) from among the scene data to the current data.

An example in which the deployment processing unit 163 subjects the attenuator parameter to the focus recall as the focus recall object will be described below. Further, in the following description, it is assumed that in the case in which the attenuator parameter is selected, the parameter selection process and the storage process (S11-S13, S21, S22) have been completed. For example, when a tap operation of "SCENE 3" in the scene list screen 6 and the recall operation for focus recall of scene 3 by the user are received (S31: Yes), the deployment processing unit 163 reads out the range data associated with the scene data of SCENE 3. Further, the deployment processing unit 163 reads out only the selected parameter(s) based on the range data (S32). The recall operation is performed by tapping the recall button 66. More specifically, the deployment processing unit 163 reads out from the scene data the parameter(s) associated with "D1" which indicates being selected.

In this example, the deployment processing unit 163 reads out only the attenuator parameter included in the scene data 50. In other words, the deployment processing unit 163 overwrites only the attenuator parameter included in the scene data 50 on the corresponding location of the current data. The deployment processing unit 163 deploys the current data overwritten with the attenuator parameter to the corresponding signal processing block 311 (S33).

As described above, the audio mixer 1 of the present embodiment receives a parameter operation and selects the parameter corresponding to the operated operator as the parameter subjected to the focus recall. Further, the audio mixer 1 of the present embodiment stores the range data that indicate the parameter subjected to the focus recall in association with the scene data. That is, in the scene data that include the selected parameter, which parameter is the parameter that is subjected to the focus object can be determined by the range data. Further, when the focus recall process is carried out, the audio mixer 1 of the present embodiment deploys, to the signal block, the parameter that is the focus object. In this manner, the audio mixer 1 can generate the scene data and set the focus object simultaneously. That is, the audio mixer 1 can receive change of the parameter(s) and selection of the parameter(s) to be recalled with a simple operation.

In the example described above, an example was described in which the scene data and the range data are stored with the storage processing unit 162 when an operation to store is received, but no limitation is imposed thereby. The storage processing unit 162 can automatically store the range data when a prescribed period of time has elapsed, or when there is a parameter operation. In this case, when an operation to store is received, the storage processing unit 162 stores the scene data, and associates the already stored range data with the stored scene data.

Modified Example 1

Figure 11:
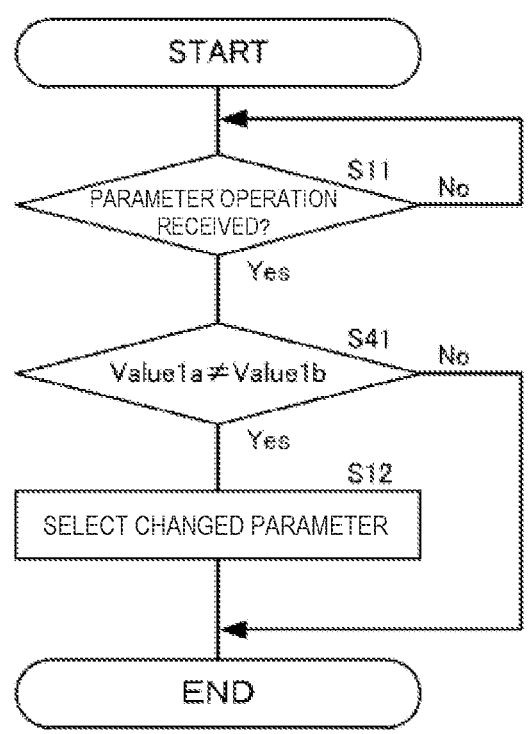
FIG. 11 is a flowchart showing a parameter selection process of Modified Example 1.

The audio mixer 1 of Modified Example 1 will be described with reference to FIG. 11. FIG. 11 is a flowchart showing the focus recall selection process. Configurations that are the same as those of the embodiment described above have been assigned the same reference symbols, and their descriptions have been omitted.

The audio mixer 1 of Modified Example 1 selects a parameter only when a value of the operated parameter is changed. The audio mixer 1 of Modified Example 1 compares the parameter value before the operator is operated and the parameter value after the operator has been operated. The audio mixer 1 of Modified Example 1 determines whether a parameter is selected as a parameter subjected to the focus recall in accordance with the comparison result.

Here, the attenuator parameter value (gain value) before operation to the knob 424 is referred to as Value1a. Further, the attenuator parameter value after operation to the knob 424 is referred to as Value1b. When the knob 424 is operated (S11: Yes), the parameter selection unit 161 compares Value1a and Value1b (S41). If Value1a and Value1b differ (S41: Yes), the parameter selection unit 161 selects the attenuator parameter (gain) as the parameter subjected to the focus recall.

In contrast, even if the operation unit 12 receives an operation to the knob 424, if Value1a and Value1b are the same (S41: No), the parameter selection unit 161 does not select Value1b as the parameter subjected to the focus recall. More specifically, if the user moves the knob 424 from −10 dB to −20 dB and then returns the knob 242 from −20 dB to −10 dB, the parameter selection unit 161 does not select the attenuator parameter as the parameter subjected to the focus recall.

The audio mixer 1 of Modified Example 1 selects a parameter as an object of the focus recall only when the parameter value before operation and the parameter value after operation differ. Even if the operator is moved by the user, the audio mixer 1 of Modified Example 1 does not select a parameter as an object of the focus recall if the parameter value before operation and the parameter value after operation are the same. Therefore, the audio mixer 1 of Modified Example 1 can prevent the parameter value from being overwritten with an unintended parameter value at the time of focus recall, when the user has no intention to set the object of the focus recall and notices an erroneous operation, and returns the operator to the position (value) before the operation.

In Modified Example 1, the example of the attenuator was described, but the same applies to other types of signal processing. For example, if the parameter value (Value2a) before the send operation is ON and the parameter value (Value2b) of the button 44 is changed to OFF from this state, Value2a and Value2b will differ. The parameter selection unit 161 selects the send parameter value (Value2b) as the object of the focus recall. Moreover, if the parameter value (Value2a) before the send operation is OFF and the parameter value (Value2b) of the button 44 is changed to ON, the parameter selection unit 161 selects the send parameter value (Value2b) as the object of the focus recall. Further, if the parameter value (Value2a) before the send operation is OFF, and, from this state, the send parameter value (Value2b) is changed to ON, the parameter selection unit 161 selects the send parameter value (Value2b) as the object of the focus recall. The "ON" state described above can have the meaning of "selection." The "OFF" state can have the meaning of "no-selection."

On the other hand, if the send parameter value (Value2a) before operation is ON, for example, and the user presses the button 44 twice successively, the send parameter value (Value2b) returns to the ON state. In this case, because Value2a and Value2b are the same values (states), the parameter selection unit 161 does not select the parameter value (Value2b) after the send operation as the parameter subjected to the focus recall.

Modified Example 2

Figure 12:
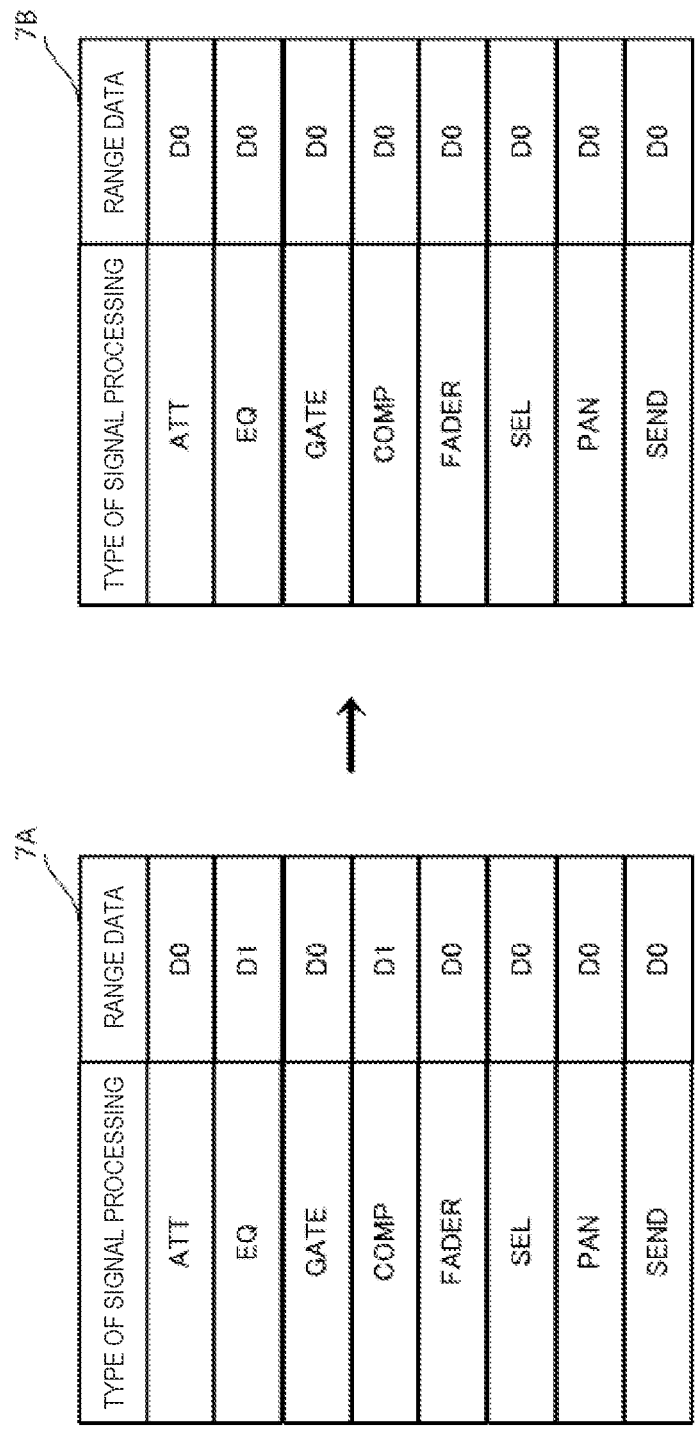
FIG. 12 is a diagram showing range data before a recall process and after the recall process in Modified Example 2.
Figure 13:
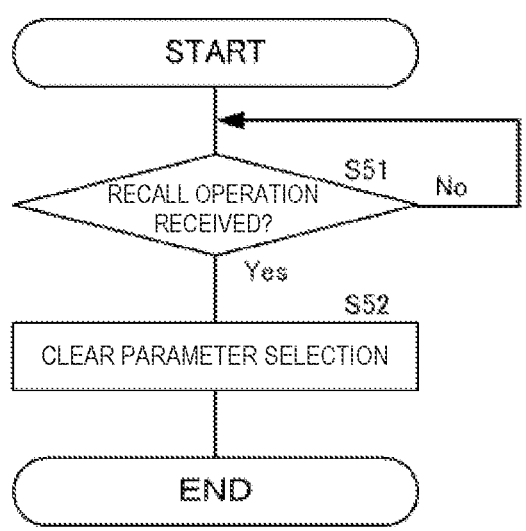
FIG. 13 is a flowchart of a selection process of a parameter to be an object of a focus recall in Modified Example 2.

The Modified Example 2 will be described with reference to FIGS. 12 and 13. FIG. 12 is a diagram showing range data before a focus recall operation (recall operation) and after a focus recall operation (recall operation) in Modified Example 2. The range data on the left side of the page in FIG. 12 indicate the state before the focus recall operation is carried out. The range data on the right side of the page in FIG. 12 indicate the state after the focus recall operation is carried out. FIG. 13 is a flowchart of selection process of a parameter to be the object of the focus recall of Modified Example 2.

When the operation unit 12 receives a recall operation for the focus recall, the audio mixer 1 of Modified Example 2 clears the selection of the parameter(s) in the focus recall. In other words, when the operation unit 12 receives the recall operation for the focus recall, the audio mixer 1 of Modified Example 2 excludes the parameter selected as the object of focus recall up to that point from the object of focus recall. More specifically, when the focus recall operation is carried out, the audio mixer 1 of Modified Example 2 clears the range data, in other words, initializes (sets the value to D0)). The audio mixer 1 then selects the newly operated parameter as the object of the focus recall, in accordance with an operation of the operator received after the range data have been cleared.

The flash memory 17 of the audio mixer 1 stores the scene data and the range data associated with the scene data. Before the focus recall operation is carried out, the range data corresponding to the equalizer parameter and the compressor parameter are "D1," as shown in FIG. 12 (see range data 7A in FIG. 12). That is, the equalizer parameter and the compressor parameter of the scene data are selected as the object of the focus recall. Here, when the focus recall operation is carried out (S51: Yes), the parameter selection unit 161 clears the parameter selection corresponding to all signal processing (S52). In other words, the parameter selection unit 161 clears (initializes) the range data associated with the scene data (see range data 7B in FIG. 12).

After the focus recall operation is carried out, the parameter selection unit 161 selects at least one or more newly operated parameters as the parameter subjected to the focus recall. For example, when the operators corresponding to the compressor, gate, selector, and send are operated, the parameter selection unit 161 newly selects the parameters corresponding to the compressor, gate, selector, and send as the parameters subjected to the focus recall. That is, the parameter selection unit 161 sets the values of the range data corresponding to the selected compressor parameter, gate parameter, selector parameter, and send parameter to "D1." Further, the storage processing unit 162 stores the range data in association with the scene data.

When the focus recall operation is received, the audio mixer 1 of Modified Example 2 clears the selection of the parameters. The audio mixer 1 of Modified Example 2 clears the selection of the parameters and then newly selects the operated parameters. As a result, the audio mixer 1 of Modified Example 2 can select parameters corresponding to the newly operated operator, rather than the parameters selected before the focus recall operation is received, as the object of the focus recall. For example, the user may wish to recall certain scene data and edit the recalled scene data. When the scene data are edited, it is necessary to reset the edited parameters as the object of the focus recall. Here, the audio mixer 1 of Modified Example 2 clears the parameter selection at the time of the focus recall operation, thus making reselection of the corresponding parameters as the object of the focus recall possible simply by a subsequent user operation of the operator. That is, when certain scene data are edited, the audio mixer 1 of Modified Example 2 automatically selects the parameters to be selected as the object of the focus recall. As a result, the audio mixer 1 can edit the scene data and reset the focus recall simultaneously.

The audio mixer 1 can store a scene group including a plurality of pieces of scene data. When the operation unit 12 receives a recall operation for the focus recall with respect to the first (leading) scene of the scene group, the audio mixer 1 can clear the parameter selection set in all of the scene data included in said scene group. For example, if scene data 1 and scene data 3 are in the same scene group, the audio mixer 1 clears not only the range data associated with scene data 1 but also the range data associated with scene data 3 when the scene data 1 are recalled.

In this case, even if a scene group including a plurality of pieces of scene data is stored, the audio mixer 1 can clear the parameter selection of each piece of scene data of the scene group at once. Therefore, it is not necessary for the audio mixer 1 of Modified Example 2 to clear the parameter selection for each piece of the scene data. Therefore, the audio mixer 1 can reduce the processing related to the focus recall in the case that a scene group including a plurality of pieces of scene data is stored.

Further, the audio mixer 1 of Modified Example 2 can separately accept an operation from the user to clear the parameter selection. FIG. 14 is an explanatory diagram showing one example of a scene list screen in Modified Example 2. In this case, the user can clear the parameter selection at any timing, instead of at the timing of carrying out the focus recall. The display 11 can display a "clear" button 67 in each scene of the scene list screen 6, for example. The audio mixer 1 of Modified Example 2 can clear the parameter selection of a scene, by a user operation of the "clear" button 67 of each scene (i.e., when the display 11 receives an operation to clear selection of the operated parameter). If the user wishes to clear a plurality of parameter selections, the user can operate the "clear" buttons 67 to cause the audio mixer 1 of Modified Example 2 to clear the plurality of parameter selections at once. After the operation to clear the parameter selection is carried out, the parameter selection unit 161 selects at least one newly operated parameter as the parameter subjected to the focus recall.

According to one embodiment of this disclosure, it is possible to receive parameter changes and selection of parameters to be recalled with a simple operation.

Finally, the description of the present embodiment in all respects serves as an example and should not be considered restrictive. The scope of this disclosure is indicated by the claims section and not by the embodiment described above. Furthermore, the scope of this disclosure includes the scope that is equivalent that of the Claims.

In the present embodiment, an example of an audio mixer was described as an example, but no limitation thereto is implied. For example, the signal processing device can be a PC, a mobile terminal, or the like.

Further, the operator corresponding to each type of signal processing is not limited to the example described above. For example, the operation unit 12 can receive an operation of an operation image corresponding to each type of signal processing displayed on the display 11.

Figure 15:
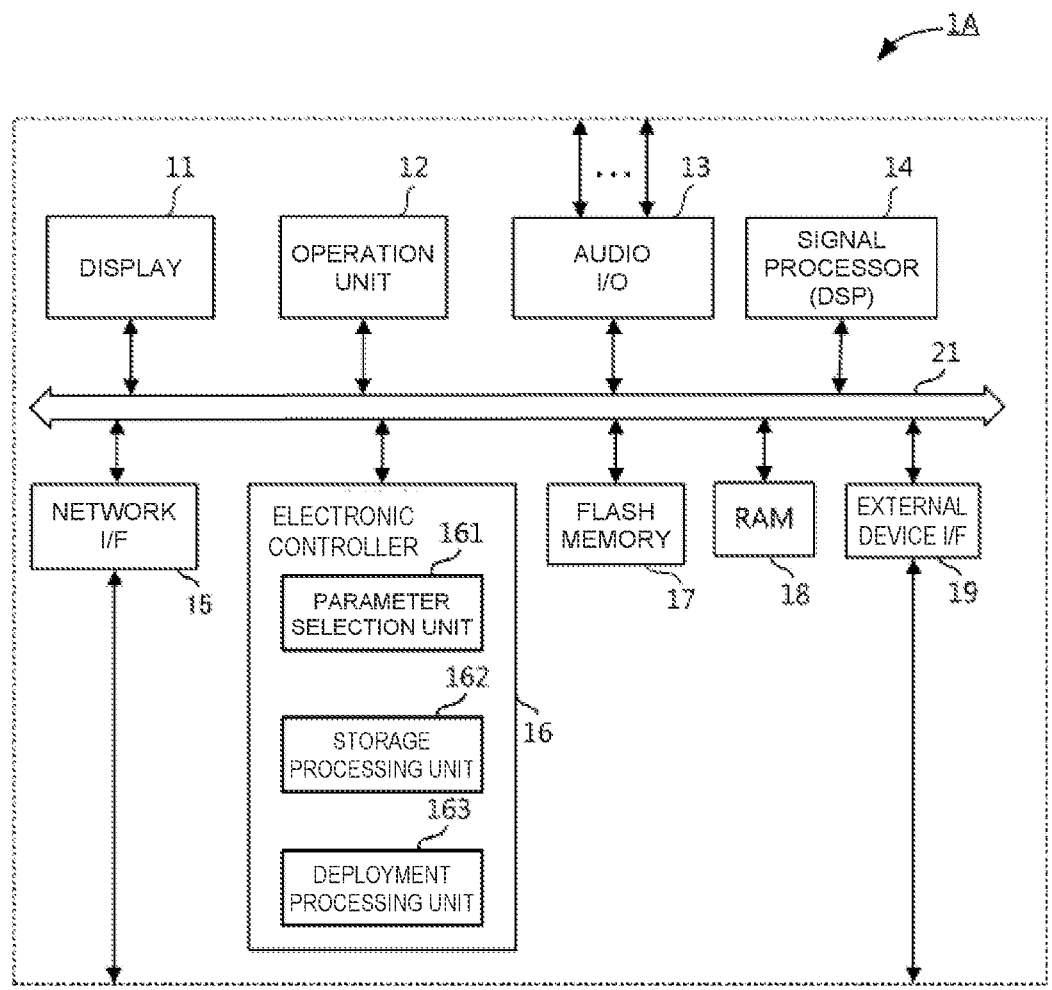
FIG. 15 is a block diagram showing another configuration of an audio mixer.

Further, in the example described above, the parameter operation is described using an example in which the user operates an operator, but no limitation thereto is implied. Parameter operations can be based on input from an external device. FIG. 15 is a block diagram showing the configuration of an audio mixer 1A. The audio mixer 1A further includes an external device interface (I/F) 19 with respect to the audio mixer 1. The other configurations and functions are the same as those of the audio mixer 1. The external device I/F 19 is an interface for sending information to and receiving information from an external device. The parameter operation can be received from an external device via the external device I/F 19 based on information (signal) that conforms to a standard, such as MIDI (Musical Instrument Digital Interface) (registered trademark).

Further, the parameter selection unit 161 can select at least one parameter corresponding to an operator only when a parameter operation from a user is received via the operator. In this case, the parameter selection unit 161 does not select a parameter by a parameter operation even when the parameter operation based on input from an external device is received via the external device I/F 19. Another user besides the user who operates the operator of the audio mixer 1A can perform a parameter operation via an external device. However, the audio mixer 1A selects the parameters that correspond to the focus recall process only when a user parameter operation via an operator is received. The audio mixer 1A can thus prevent a parameter selection that escapes the notice of the user who operates the operator of the audio mixer 1A. As a result, the audio mixer 1A can prevent the parameter recalling undesired by the user who operates the operator of the audio mixer 1 at the time of scene recall.

Further, the storage processing unit 162 can store only the parameters selected to be the object of the focus recall as the scene data in the storage unit such as the flash memory 17. In this case, when the focus recall operation is received, the deployment processing unit 163 overwrites only the parameter(s) included in the scene data on the current data and deploys only the parameter(s) to the corresponding signal processing block(s). In this manner, the audio mixer 1 can read out only the selected parameter(s) and deploy the selected parameter(s) in the plurality of signal processing blocks, even if there is no range data.

Signal Processing Other Than That of Attenuator in Focus Recall Process

Further, the one or more parameters subjected to the focus recall process are not limited to the example of the attenuator described above. The audio mixer 1 performs the same process as that described in the example of the attenuator when at least one operator corresponding to at least one type or more of signal processing, from among the attenuator, equalizer, gate, compressor, fader, panning, selector, or send, is operated.

For example, if at least one or more of the knobs 421, 422, or 423 is operated, the parameter selection unit 161 selects as the focus recall object the equalizer parameter corresponding to the knobs 421, 422, 423. The storage processing unit 162 stores the range data that reflect the selected parameter in the storage unit, such as the flash memory 17.

Further, when the knob 425 is operated, the parameter selection unit 161 selects as the focus recall object the gate parameter corresponding to the knob 425. The storage processing unit 162 stores the range data that reflect the selected parameter in a storage unit, such as the flash memory 17.

Further, when the knob 426 is operated, the parameter selection unit 161 selects as the focus recall object the compressor parameter corresponding to the knob 426. The storage processing unit 162 stores the range data that reflect the selected parameter in a storage unit, such as the flash memory 17.

Further, when the knob 427 is operated, the parameter selection unit 161 selects as the focus recall object the panning parameter corresponding to the knob 427. The storage processing unit 162 stores the range data that reflect the selected parameter in a storage unit, such as the flash memory 17.

Further, when the slider 41 is operated, the parameter selection unit 161 selects as the focus recall object the fader parameter corresponding to the slider 41. The storage processing unit 162 stores the range data that reflect the selected parameter in a storage unit, such as the flash memory 17.

Further, when the button 43 is operated, the parameter selection unit 161 selects as the focus recall object the selector parameter corresponding to the button 43. The storage processing unit 162 stores the range data that reflect the selected parameters in a storage unit, such as the flash memory 17.

Further, when the button 44 is operated, the parameter selection unit 161 selects as the focus recall object the send parameter corresponding to the button 44. The storage processing unit 162 stores the range data that reflect the selected parameter in a storage unit, such as the flash memory 17.

What is claimed is:

1. A signal processing method comprising:
   inputting a sound signal to a plurality of signal processing blocks for different types of signal processing;
   signal-processing the sound signal input to the signal processing blocks based on setting data having a plurality of parameters for the different types of signal processing, respectively;
   receiving a parameter operation for setting at least one of the parameters;
   setting at least one indicator for the at least one of the parameters, respectively, in response to receiving the parameter operation for the at least one of the parameters;
   updating the setting data based on the parameter operation; and
   reading out only the at least one of the parameters to which the at least one indicator is set while a remainder of the parameters is not read out and deploying the at least one of the parameters that has been read out to at least one of the signal processing blocks corresponding to the at least one of the parameters that has been read out, in response to receiving a recall operation for reading out the setting data.

2. The signal processing method according to claim 1, wherein
   the parameter operation is at least one or more of
   an operation to change at least one of a plurality of values for the at least one of the parameters, respectively,
   an operation to change from selection to no-selection for the at least one of the parameters, or
   an operation to change from no-selection to selection for the at least one of the parameters.

3. The signal processing method according to claim 2, wherein
   the at least one indicator is set only for the at least one of the parameters for which the parameter operation has been received.

4. The signal processing method according to claim 1, wherein
   the parameter operation is received from an operator and an external device, and
   the setting of the at least one indicator is performed only in response to receiving the parameter operation via the operator.

5. The signal processing method according to claim 1, wherein-further comprising
   storing the setting data in response to receiving a storage operation for storing the setting data, and
   in response to receiving the storage operation, the setting data are stored in association with range data which contain the at least one indicator that is set for the at least one of the parameters and at least one different indicator for the remainder of the parameters.

6. The signal processing method according to claim 1, further comprising
   clearing the at least one indicator in response to receiving the recall operation, and newly setting at least one new indicator for at least one of the parameters, respectively, in response to newly receiving the parameter operation for the at least one of the parameters after the recall operation is received.

7. The signal processing method according to claim 1, wherein further comprising
   storing the setting data for each scene of a scene group that includes a plurality of scenes,
   clearing the at least one indicator for the scene group in response to receiving the recall operation of the setting data with respect to a leading scene of the scene group, and
   newly setting at least one new indicator for at least one of the parameters, respectively, in response to newly receiving by the parameter operation for the at least one of the parameters after the recall operation is received.

8. The signal processing method according to claim 1, further comprising
   receiving a clear operation to clear the at least one indicator, and
   in response to newly receiving the parameter operation for at least one of the parameters after the clear operation, newly setting at least one new indicator for the at least one of the parameters, respectively.

9. The signal processing method according to claim 1, wherein
   the signal processing method is executed by an audio mixer with a plurality of user operable elements for independently setting the parameters, respectively.

10. A signal processing device comprising:
    a sound signal input configured to input a sound signal;
    a signal processor configured to input the sound signal to a plurality of signal processing blocks for different types of signal processing, and signal-process the sound signal input to the signal processing blocks based on setting data having a plurality of parameters for the different types of signal processing, respectively;
    a user operable input configured to receive a parameter operation for setting at least one of the parameters; and
    an electronic controller including at least one processor, the electronic controller being configured to execute a plurality of units that include
    a parameter selection unit configured to set at least one indicator for the at least one of the parameters, respectively, in response to the user operable input receiving the parameter operation for the at least one of the parameters, and update the setting data based on the parameter operation, and a deployment processing unit configured to read out only the at least one of the parameters to which the at least one indicator is set while a remainder of the parameters is not read out, and deploy the at least one of the parameters that has been read out to at least one of the signal processing blocks corresponding to the at least one of the parameters that has been read out, in response to reception of a recall operation for reading out the setting data.

11. The signal processing device according to claim 10, wherein the user operable input is configured to receive the parameter operation including at least one or more of an operation to change at least one of a plurality of values for the at least one of the parameters, respectively, an operation to change from selection to no-selection for the at least one of the parameters, or an operation to change from no-selection to selection for the at least one of the parameters.

12. The signal processing device according to claim 11, wherein the parameter selection unit is configured to set the at least one indicator only for the at least one of the parameters for which the parameter operation has been received.

13. The signal processing device according to claim 10, further comprising an interface configured to receive the parameter operation from an external device, wherein the user operable input has an operator configured to receive the parameter operation, and the parameter selection unit is configured to set the at least one indicator only in response to receiving the parameter operation via the operator.

14. The signal processing device according to claim 10, further comprising a storage processing unit configured to store the setting data, wherein the user operable input is configured to receive a storage operation for storing the setting data, and in response to the user operable input receiving the storage operation, the storage processing unit is configured to store the setting data in association with range data which contain the at least one indicator that is set for the at least one of the parameters and at least one different indicator for the remainder of the parameters.

15. The signal processing device according to claim 10, wherein in response to the reception of the recall operation, the parameter selection unit is configured to clear the at least one indicator and newly set at least one new indicator for at least one of the parameters, respectively, in response to newly receiving the parameter operation for the at least one of the parameters after the recall operation is received.

16. The signal processing device according to claim 10, further comprising a storage processing unit configured to store the setting data for each scene of a scene group that includes a plurality of scenes, wherein in response to the reception of the recall operation of the setting data with respect to a first scene in the scene group, the parameter selection unit is configured to clear the at least one indicator for the scene group and newly set at least one new indicator for at least one of the parameters, respectively, in response to newly receiving by the parameter operation for the at least one of the parameters after the recall operation is received.

17. The signal processing device according to claim 10, wherein the user operable input is further configured to receive a clear operation to clear the at least one indicator, and the parameter selection unit is further configured to, in response to newly receiving the parameter operation for at least one of the parameters after the clear operation, newly set at least one new indicator for the at least one of the parameters, respectively.

* * * * *